United States Patent Office 3,778,326
Patented Dec. 11, 1973

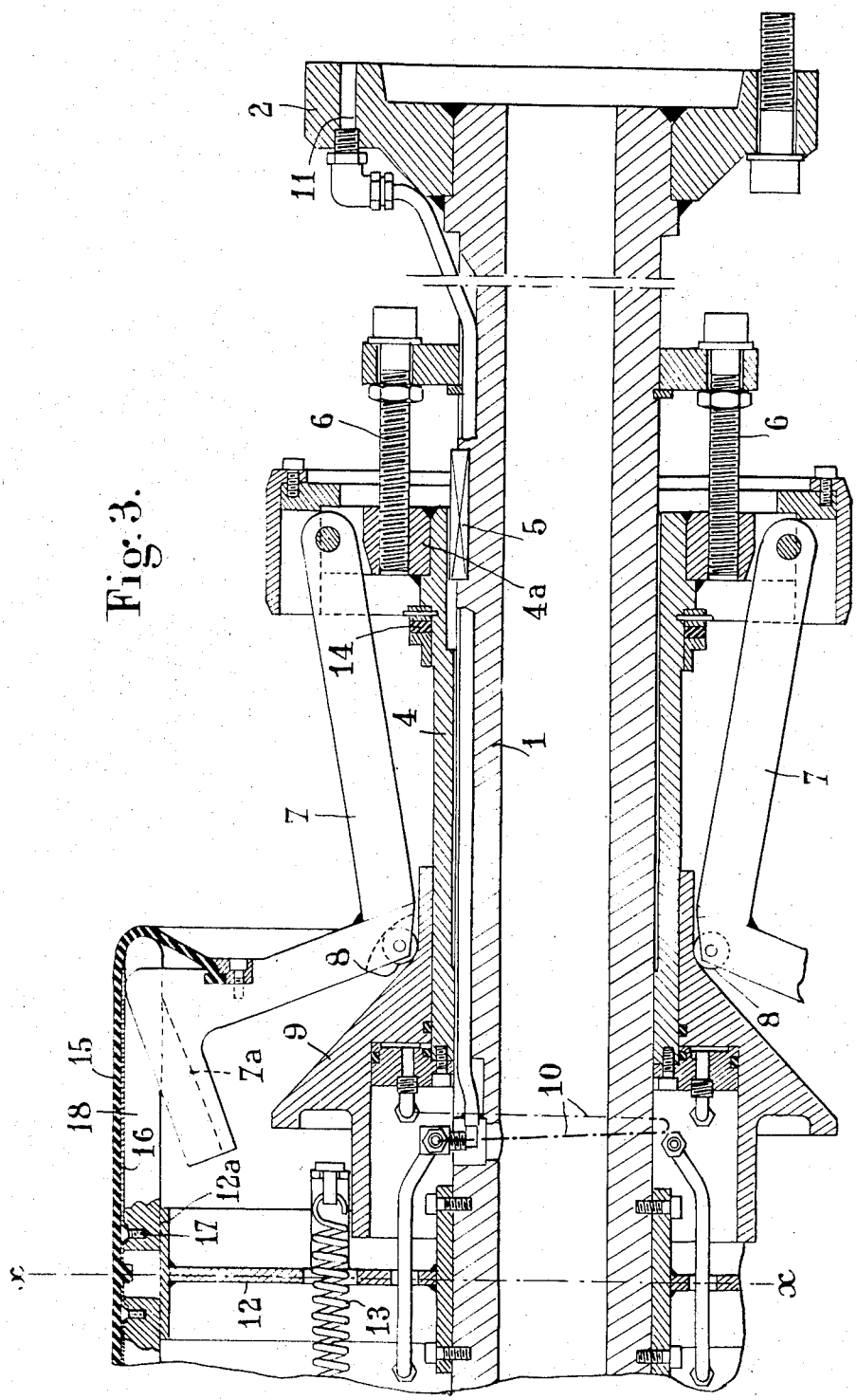

3,778,326
TIRE-MAKING DRUM
Georges Gazuit, Chemin Chauveau,
03 Montlucon, France
Filed June 21, 1971, Ser. No. 154,987
Claims priority, application France, Jan. 26, 1971,
7102503
Int. Cl. B29h 17/16
U.S. Cl. 156—417
4 Claims

ABSTRACT OF THE DISCLOSURE

This tire-making drum intended notably for machines of the type utilized for making conventional or radial-ply heavy truck tires comprises on either side an assembly surrounding an axial spindle, each assembly comprising an annular sleeve rigid with the spindle and formed with end radial extensions forming with said sleeve and an annular cam member slidably mounted on said sleeve a variable-capacity chamber connected to a source of fluid under pressure. One extension of said sleeve is strap-shaped and has pivoted thereon a double-crank lever carrying on its first elbow a roller engaging a tapered outer face of said annular cam member, all the outermost rectilinear segments of the two opposite sets of levers are covered by a resilient membrane reinforced by inner blades and transverse members. Spring means urge the annular members symmetrically towards each other and towards the median plane of the drum. When these annular cam members are in their innermost position, i.e. close to said median plane, said chambers have zero capacity and the membrane has its maximum diameter; introducing pressure fluid into these chambers will move the annular cam members to their outermost position in which the membrane has its smallest diameter. The members reinforcing said resilient membrane are adapted to engage corresponding grooves formed in the outer surfaces of said outermost rectilinear segments of the double-crank levers.

BACKGROUND OF THE INVENTION

The present invention relates to drums of the type used for making tires, notably conventional or radial tires for heavy lorries, trucks and other transport vehicles.

DESCRIPTION OF THE PRIOR ART

In the tire industry all-metal drums are already known but they are objectionable because upon completion of the tire making operation the lateral elements, numbering approximately 4 to 8 per side, must be removed manually from the drum, whereafter the central portion must be collapsed and folded for releasing completely the finished tire.

Now the disassembling and re-assembling of these lateral elements, as well as the expansion and collapsing of the drum, constitute tedious operations to be performed and repeated each time a fresh tire has been made, thus causing considerable losses of time and also a premature wear and tear of all mechanical components.

SUMMARY OF THE INVENTION

The novel tire-making drum according to the present invention is so designed that it assumes very rapidly an operative position or a tire release position without requiring any disassembling operation. Moreover, it is extremely rigid, its stiffness corresponding substantially to that of an all-metal drum, and furthermore it can be reduced both in diameter and in width simultaneously, so that the finished tire can easily be removed therefrom.

The tire-making drum according to this invention comprises, on each one of its main faces, an assembly radiating regularly about an axial spindle, each assembly comprising an annular sleeve rigidly mounted to said axial spindle and provided at its ends with two radial extensions, of which a first radial extension, on the input side of the axial spindle, is shaped to provide a plurality of straps, the other radial extension being directed towards the interior of said axial spindle; a series of double-crank levers pivotally mounted in said straps and carrying each at the first elbow adjacent to its pivotal mounting on said strap a loosely rotating roller adapted to engage an inclined or tapered annular surface of a cam member adapted to slide along said central spindle, said cam member comprising an inner space forming with said annular sleeve and its second radial extension a variable-volume chamber, and means for supplying compressed fluid to said chamber in order to control the axial movement of said tapered annular surface in relation to the rollers by varying the inclination of said levers in relation to said axial spindle between two limit values corresponding to two limit values of the radial distance measured from the lever point remotest from the axis of said axial spindle.

The shape of each lever may be so determined that in the position of maximum radial distance of its end the third rectilinear segment of this lever, which leads to this end, lies parallel to said axial spindle. Thus, the assembly of these rectilinear lever sections will then form on the outer periphery of the drum a substantially continuous cylindrical metal bearing structure.

This invention further comprises means for adjusting the position of said radial assemblies along the spindle axis and therefore the length of the drum in its different positions.

BRIEF DESCRIPTION OF THE DRAWINGS

The features and advantages characterizing this invention will appear more completely from the following description given with reference to the accompanying drawings illustrating diagrammatically by way of example a typical form of embodiment of the invention. In the drawings:

FIGS. 2 and 3 show on a larger scale and in axial section the two portions of FIG. 1.

DESCRIPTION OF THE PREFERRED EMBODIMENTS

Figure 1:
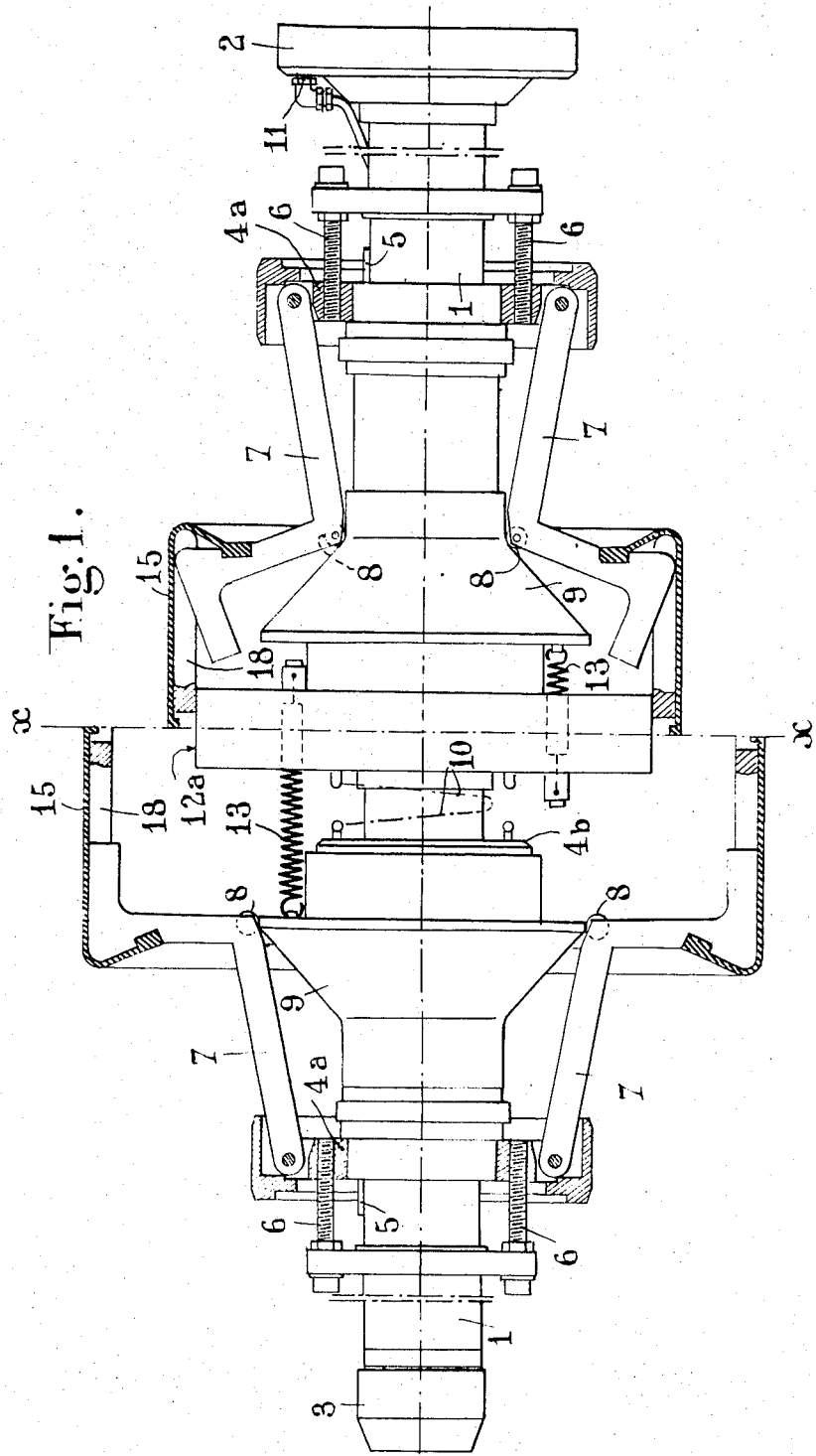
FIG. 1 is a side elevational and part-sectional view showing the drum with its left-hand half in its expanded condition and its right-hand half in its contracted position.

The drum is mounted on a tubular axial spindle 1 having at one end a flange 2 in which the spindle of the tire-making machine proper is adapted to be fitted and centered. At the opposite end a rotary centering member 3 is provided for receiving the tail-stock spindle of the machine.

Surrounding the axial spindle 1 and adjacent the two ends thereof are two regularly radiating assemblies. Each assembly comprises a sleeve 4 rotatably rigid with the axial spindle 1, due to the provision of a key 5. This sleeve 4 comprises at its first, outer end a radial extension 4a formed with a tapped hole parallel to the spindle axis and engaged by the screw-threaded shank of a bolt 6 adapted to make the sleeve 4 rigid with the spindle 1 in the axial direction, while permitting the proper adjustment of the axial position of said sleeve in relation to said spindle. The radial extension 4a further comprises a strap portion in which one end of a double-crank lever or link 7 is mounted for pivotal movement in a radial plane, this lever 7 carrying just after its first elbow a loosely rotating roller 8, as shown.

At its other end opposite to that keyed on the spindle the sleeve 4 carries another radial extension 4b. A tapered annular cam member 9 slidably mounted on the outer surface of sleeve 4 and engageable by the rollers 8 of the plurality of levers 7 is provided with an annular inner space forming in conjunction with said sleeve 4 and said radial extension 4b a variable-capacity fluid-tight chamber connected through a suitable pipe 10 to a pressure fluid inlet 11. The two annular tapered cam members 9 disposed on either side of the median transverse plane $x$—$x$ of the drum are interconnected in order to remain constantly symmetric in relation to said plane during their movements along the axial spindle 1. This connection may be obtained by using for instance a pair of racks each rigid with one of the cam members 9 and meshing with a pinion having its shaft rigid with the spindle 1 and mounted, for example on the web 12 surrounding, and rigid with, this spindle in the median plane $x$—$x$ of the drum. Each annular cam member 9 is resiliently connected to the web 12 by means of traction springs 13 constantly urging this member 9 towards the median plane $x$—$x$ of the drum and is movable between two end positions of which one is close to the median plane $x$—$x$, in which the member 9 abuts against the second radial extension 4b of the corresponding sleeve 4, the other end position being the remotest one with respect to said median plane $x$—$x$ and obtained by introducing fluid under pressure into the chamber formed by said member 9 on sleeve 4; the member 9 is retained in this axial position by a resilient annular stop 14 rigid with the sleeve 4.

Secured to the outer portions of the double-crank levers 7 is a one-piece resilient membrane or cover 15 surrounding completely the two sets of third rectilinear segments of these levers, as counted from the pivotal mounting thereof. Along the greater part of its width, on either side of the median plane $x$—$x$, this resilient membrane 15 is reinforced, on its substantially cylindrical inner wall facing the axial spindle 1, by a plurality of transverse blades 16 extending parallel to the spindle 1. Transverse metal members 18, each engaging a groove 7a formed in the outer face of said third rectilinear segment of each lever 7 are secured by means of screws 17 to the inner face of said blades 16.

When the annular cam members 9 are in their first endmost position, i.e. in the released position illustrated in the right-hand half of FIG. 1 and in FIG. 3, each transverse metal member 18 bears with its outer end in the groove 7a of the relevant lever 7, and the end adjacent the median plane $x$—$x$ of this transverse member 18 bears on a cylindrical extension 12a of the outer periphery of web 12. In this position of cam members 9 the peripheral portion of resilient membrane 15 assumes a cylindrical outer surface configuration, coaxial to the spindle 1, in which it is rigidly held by the two series of transverse metal members 18.

Figure 2:
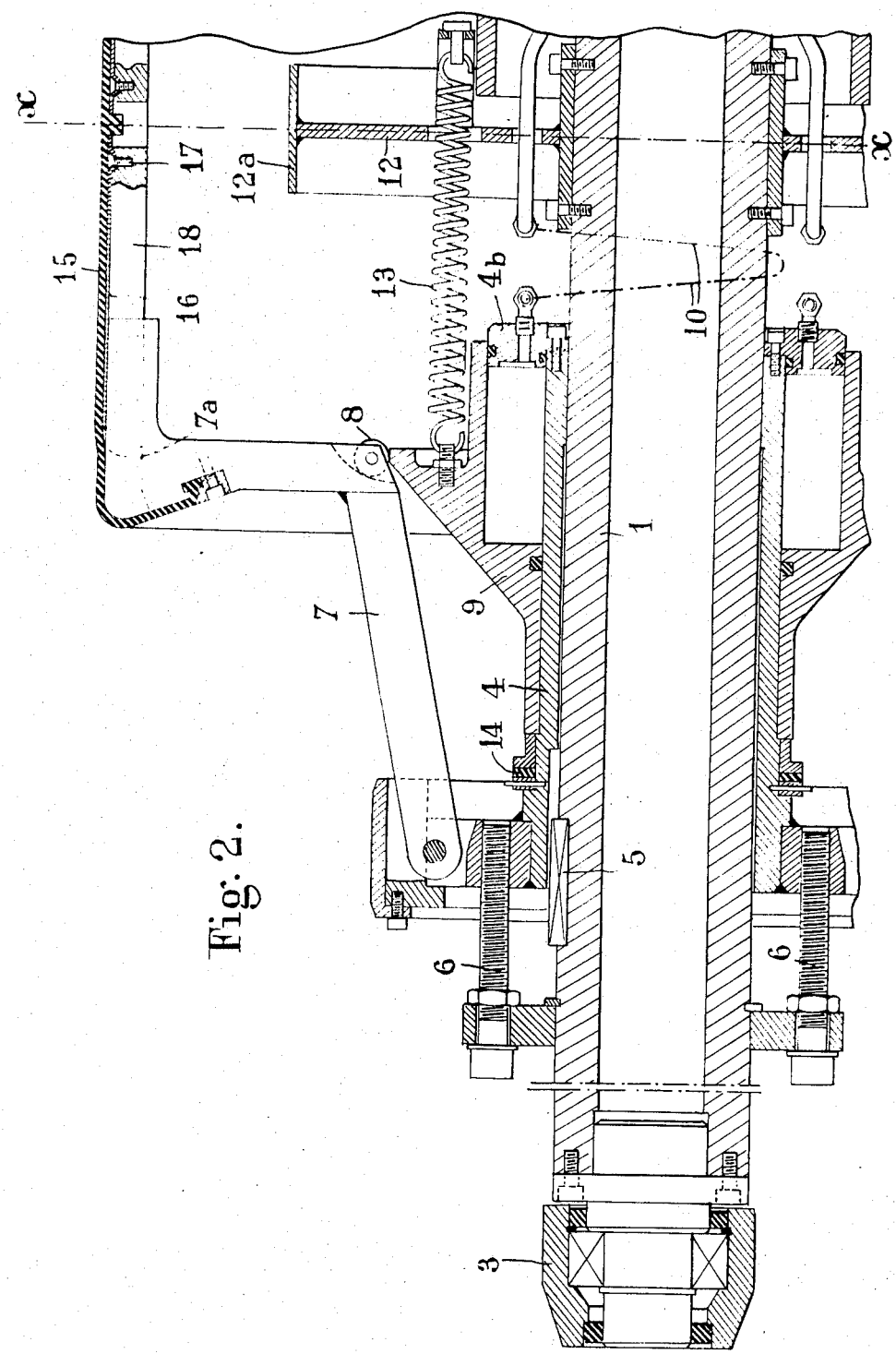

When the annular cam members 9 are pushed to their other end position illustrated in the left-hand portion of FIG. 1 and in FIG. 2, as a consequence of the supply of compressed fluid to the chambers formed by these members and by the corresponding sleeves 4 and extensions 4b thereof, the drum diameter increases with respect to that obtained in the retracted position shown in the right-hand half of FIG. 1 and in FIG. 3, the drum surface remaining constantly rigid, cylindrical and coaxial to the spindle 1. When the annular cam members 9 abut against the resilient stops 14, the drum has its maximum diameter and the transverse metal members 18 are supported completely in the registering grooves 7a of the rectilinear segments of levers 7. Under these conditions, the drum is ready to receive the elements of the tire to be manufactured.

Upon completion of the various tire manufacturing operations it is only necessary to cut off the supply of compressed fluid to the chambers controlling the annular cam members 9 for allowing the return springs 13 to move the drum back to its folded position as shown in the right-hand half of FIG. 1 and in FIG. 3, thus permitting an easy removal of the finished tire.

In the adjustment position of bolts 6 which is shown in the drawings the drum may be used for making tires of a diameter greater than that of the fully folded drum as shown in the drawings up to a diameter having for instance the maximum permissible value also illustrated in the drawings. When it is desired, with the same diameters, to modify the width of the tires to be manufactured, it is only necessary to change the adjustment of bolts 6.

It may also be noted that the tire may also be manufactured according to the so-called ring method. In this case, the ring member prepared in another machine is fitted to the drum when the latter is in its folded condition. Then the drum is expanded until the ring itself is regularly expanded to the desired diameter permitting of completing the manufacturing process.

What I claim is:

1. Tire-making drum comprising a spindle coaxial to a general axis of symmetry and provided on either side of the general plane of symmetry with a radial extension, an annular set of hinges mounted in each radial extension, a plurality of links each divided by two elbows into three successive rectilinear segments of which a first segment is pivotally mounted to one of said hinges of an annular set of hinges, the other two rectilinear segments extending towards the general plane of symmetry, the third segment having a trough formed in its outer face with respect to the general axis of symmetry, a pair of cams symmetrically and slidably mounted on said axial spindle and comprising external tapered surfaces sloping towards the spindle ends, rollers each mounted on the first elbow of one of said links for engaging one of said cams, an annular elastic diaphragm having its lateral edges fastened to said second rectilinear segments of said links at a point of said second segment of each one of said links which lies on the outer face of said segment in relation to the general plane of symmetry and is recessed towards the general axis of symmetry in relation to the second elbow of said link so as to push said links for tilting then towards said spindle and causing said rollers to engage said cams, and a plurality of cross-members fitted under said annular elastic diaphragm, each cross member engaging with its ends the troughs formed in the outer faces in relation to the general axis of symmetry of the third rectilinear segments of the two links disposed in a common radial plane and means for separating said cams to expand said drum.

2. Tire-making drum as set forth in claim 1, wherein the sliding movement of each tapered cam on said spindle is limited by stop members between two end positions of which the one nearest to the general plane of symmetry is adapted to set said links in their position nearest to the general axis of symmetry in which said cross members bear against a cylindrical extension of a median flange rigid with said spindle, the end position remotest from the general plane of symmetry causing said links to assume their remotest position in relation to the general axis of symmetry in which the third rectilinear segments of said links are parallel to the general axis of symmetry and to the cross members supported by said third sections.

3. Tire-making drum as set forth in claim 2, wherein each radial extension of said spindle is carried by the end opposite to the general plane of symmetry of a sleeve adjustably mounted to said spindle, the sleeve portion which extends towards said general plane of symmetry carrying one of said sliding cams as well as said pair of stop members.

4. Tire-making drum as set forth in claim 1, which comprises spring means for constantly urging said pair of cams towards each other and wherein each cam comprises a hollow portion forming about said spindle a variable volume increasing in the direction of said cams away from each other and which is adapted to be supplied with compressed fluid.

References Cited
UNITED STATES PATENTS

| | | | |
|---|---|---|---|
| 3,178,331 | 4/1965 | Bishop et al. | 156—415 |
| 2,339,543 | 1/1944 | Bishop | 156—420 X |
| 3,536,566 | 10/1970 | Frazier et al. | 156—420 X |
| 3,637,450 | 1/1972 | Bryant | 156—415 |
| 3,207,648 | 9/1965 | Shilts | 156—415 |
| 3,140,216 | 7/1964 | Shilts | 156—415 X |
| 2,715,933 | 8/1955 | Frazier | 156—415 |

RALPH S. KENDALL, Primary Examiner

C. B. COSBY, Assistant Examiner

U.S. Cl. X.R.

156—414, 420